United States Patent
Tran et al.

(10) Patent No.: US 6,868,050 B1
(45) Date of Patent: Mar. 15, 2005

(54) CALIBRATION METHOD FOR WRITING TO OPTICAL MEDIA

(75) Inventors: Paul Phuc Tran, Milpitas, CA (US); Wei Qian, Sunnyvale, CA (US)

(73) Assignee: ProMOS Technologies Inc., Hsing-Chu (TW)

( * ) Notice: Subject to any disclaimer, the term of this patent is extended or adjusted under 35 U.S.C. 154(b) by 473 days.

(21) Appl. No.: 09/639,376

(22) Filed: Aug. 15, 2000

(51) Int. Cl.[7] .............................. G11B 7/00; G11B 5/09
(52) U.S. Cl. ................ 369/47.5; 369/53.25; 369/59.11; 369/59.21; 369/44.34
(58) Field of Search .......................... 369/44.27, 44.34, 369/44.29, 44.35, 47.53, 53.25, 53.26, 53.28, 53.31, 53.38, 59.11, 116, 124.04, 124.07, 47.5, 47.51, 59.21, 124.05

(56) References Cited

U.S. PATENT DOCUMENTS

| | | | | |
|---|---|---|---|---|
| 4,907,212 A | * | 3/1990 | Pharris et al. ........... 369/53.34 |
| 5,699,330 A | * | 12/1997 | Ogino et al. ............. 369/44.27 |
| 5,825,729 A | * | 10/1998 | Ogasawara et al. ...... 369/44.27 |
| 6,292,448 B1 | * | 9/2001 | Yoshida et al. .......... 369/47.53 |
| 6,580,669 B1 | * | 6/2003 | Graba et al. ............. 369/124.1 |

* cited by examiner

*Primary Examiner*—Thang V. Tran
(74) *Attorney, Agent, or Firm*—Sawyer Law Group LLP

(57) ABSTRACT

The present invention provides a method and system for calibration of writing to an optical medium. The method includes: sampling marks in a calibration area of the optical medium; and converting the sampled marks into a digital format utilizing an ADC, the ADC also utilized by a servo control. The present invention provides a controller with an integrated servo and recording processor which allows a single ADC to be used for converting sample marks used in calibrating the writing to an optical media. No separate subsystem for converting sample marks is thus necessary. Less components are required, reducing the cost of manufacturing the controller. With less components, the risk of component failure is reduced as well.

12 Claims, 3 Drawing Sheets

CALIBRATION METHOD FOR WRITING TO OPTICAL MEDIA

FIELD OF THE INVENTION

The present invention relates to optical media, and more particularly to the calibration of the writing to optical media.

BACKGROUND OF THE INVENTION

Optical drives capable of recording data on optical media are well known in the art. These drives include the Compact Disc-Read/Write (CD-R) drives, which can read CD-based formats and read and write to Write Once Media, and Compact Disc-Rewritable (CD-RW) drives, which can read CD-based formats and read and write to Write Once Media and Rewritable Media. The standard CD recordable and rewritable media and format is set forth in what is commonly referred to in the art as the "orange book". Under the standard, the writing of data is described in terms of "T", where T is a fundamental unit of time, and has a minimum mark of 3T and a maximum mark of 11T. The writing of the 3T mark is the most critical due to its size, thus the standard sets forth when to heat and cool the recording material in writing the 3T mark. A Non-Return to Zero Inverted (NRZI) method of recording is used, where a zero is represented by a change in the write control signal and a one by no change. When the write control signal first changes, the heating of the media begins. When the write control signal is changed again, the heating ends, and the media is cooled to end the mark. When the media is heated and cooled to form a 3T mark varies with the type of media, and is set by the standard.

Prior to the writing of data, the writing profile for the particular recording media need to be calibrated to ensure that the data may be reliably read. For this purpose, each CD-R or CD-RW has an area called the "calibration area", where marks are made and sampled to determine the quality of the writing. Analog signals carrying the sampled marks are converted to digital signals by an analog-to-digital converter (ADC). The digital signals contain process amplitude and reflection values of the sampled marks, which are then used to compute the beta and gamma values according to the orange book. Beta and gamma values are well known in the art and will not be further described here. In this specification, the beta and gamma values are collectively referred to as "calibration values". The calibration values are then compared to reference values to determine the quality of the sampled marks. Based upon the result, the write control parameters may be adjusted.

In conventional CD-R or CD-RW controllers, a subsystem separate from the servo subsystem is required to sample the marks. This is so that the servo may maintain its position over the recording media while the sample is collected. However, the need for the separate subsystem increases the cost of manufacturing the controller. It also increases the amount of components which increases the risk of component failure.

Accordingly, there exists a need for an improved method and system for calibration of writing to an optical media. The improved method and system should decrease the cost of manufacturing the controller and decrease the risk of component failure. The present invention addresses such a need.

SUMMARY OF THE INVENTION

The present invention provides a method and system for calibration of writing to an optical medium. The method includes: sampling marks in a calibration area of the optical medium; and converting the sampled marks into a digital format utilizing an ADC, the ADC also utilized by a servo control. The present invention provides a controller with an integrated servo and recording processor which allows a single ADC to be used for converting sample marks used in calibrating the writing to an optical media. No separate subsystem for converting sample marks is thus necessary. Less components are required, reducing the cost of manufacturing the controller. With less components, the risk of component failure is reduced as well.

DETAILED DESCRIPTION

The present invention provides an improved method and system for calibration of writing to an optical media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention provides a controller with an integrated servo/recording processor which allows a single analog-to-digital converter (ADC) to be used for servo control and for converting sample marks used in calibration of writing to an optical media. This decreases the cost of manufacturing the controller and decreases the risk of component failure.

To more particularly describe the features of the present invention, please refer to FIGS. 1 through 3 in conjunction with the discussion below.

Figure 1:
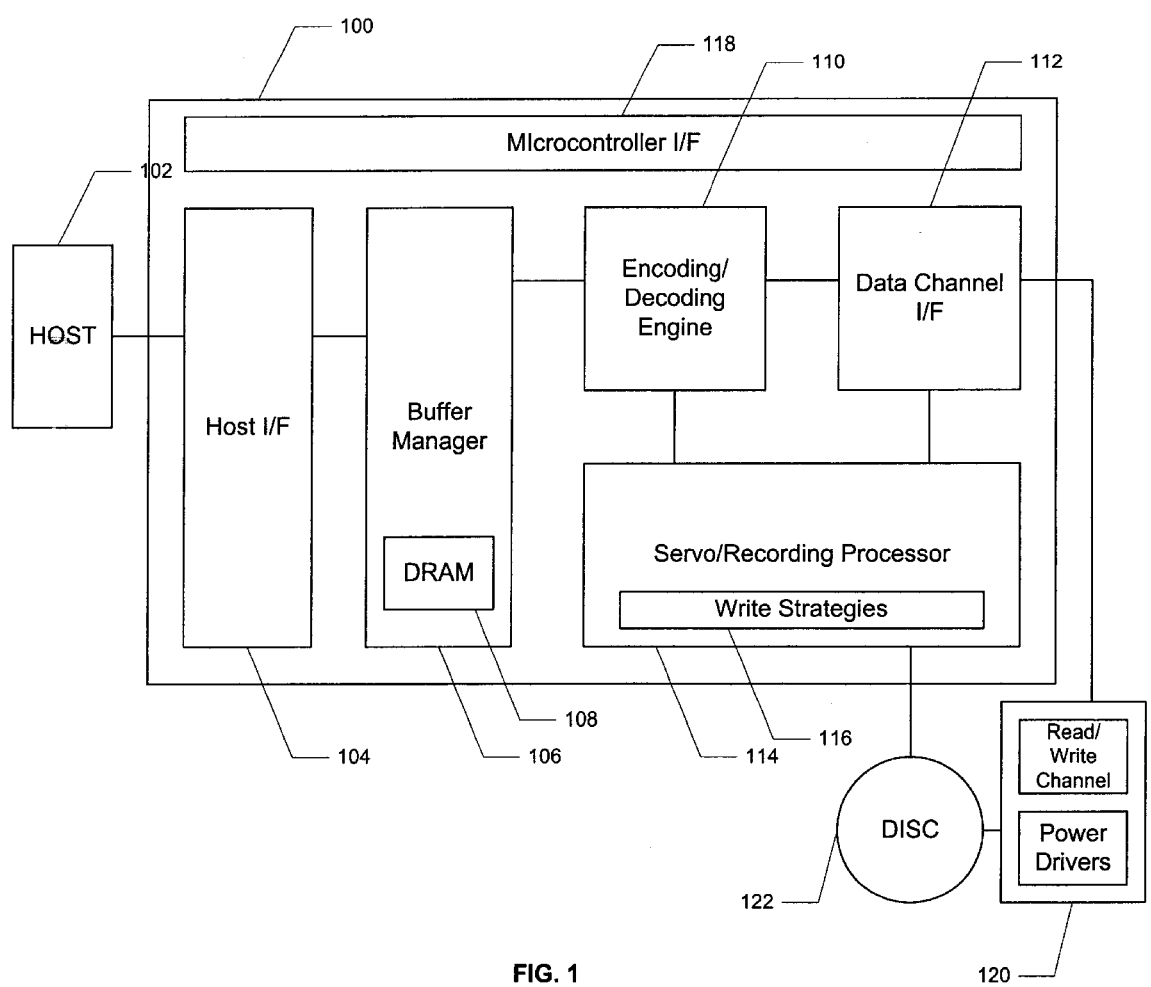
FIG. 1 is a block diagram illustrating a preferred embodiment of a controller which may use the method and system in accordance with the present invention.

FIG. 1 is a block diagram illustrating a preferred embodiment of a controller which may use the method and system in accordance with the present invention. The elements 104–118 represent the logical architecture of the controller 100. The controller 100 comprises a host interface 104, a buffer manager 106 with an embedded memory 108, an integrated encoding/decoding engine 110, a data channel interface 112, an integrated servo/recording processor 114 embedded with the write strategies 116, and a microcontroller interface 118. In the preferred embodiment, the embedded memory 108 is an embedded dynamic random access memory (DRAM). The integrated servo/recording processor 114 provides the mechanical control of the disc 120 and the spindle and sledge (not shown) of the drive for both reading and writing of data. The servo/recording processor 114 interfaces with the disc 122 in the writing of data. Integrated into the processor 114 are the write strategies 116 which controls the writing of the data so that the data is in a standard format. The controller 100 is further described in co-pending U.S. Patent Application entitled "Integrated Controller To Process Both Optical Reads And Optical Writes Of Multiple Optical Media", Ser. No. 09/652,254, filed on Aug. 30, 2000. Applicant hereby incorporates this patent application by reference.

Figure 2:
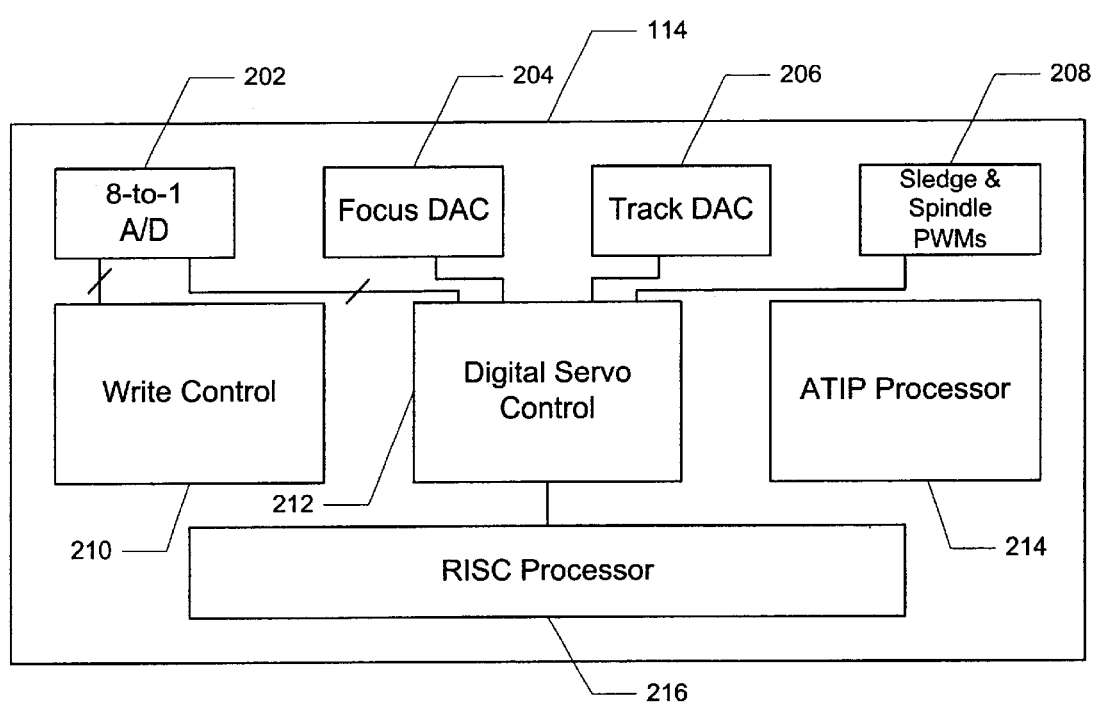
FIG. 2 illustrates in more detail the integrated servo/recording processor of the preferred embodiment of the controller which may use the calibration method in accordance with the present invention.

FIG. 2 illustrates in more detail the integrated servo/recording processor of the preferred embodiment of the controller which may use the calibration method in accordance with the present invention. The integrated servo/recording processor 114 comprises a reduced instruction set computer (RISC) processor 216 that takes the high level command from an external microcontroller, via a proprietary communication protocol, and performs the necessary servo functions to seek and track the required target data stream. The RISC processor 216 has full access and control of the on-chip, multi-channel ADC 202, digital to analog converters 204, 206 (DAC) and sledge and spindle pulse width modulator 208 (PWM) to sample the servo data (track, focus, center errors, beam strength, and radio frequency). The RISC processor 216, via the digital servo control 212, provides control to the spindle, sledge, focus, and track coils.

In writing data, the encoded data flows to the write control 210 of the servo/recording processor 114. The write strategies 116 are part of the write control 210. The write control 210 performs EFM encoding, NRZI conversion, and generate the actual mark and space patterns for writing to the disc 122 via the external read/write channel 120. In conjunction with this write data flow, the Absolute Time in Pregroove (ATIP) processor 214 decodes the ATIP data already on the disc 222 to provide the physical address of the data so as to control the laser burns and servo tracking to the desired writing locations. The data's physical address is then stored in a table on the disc 122 along with its logical address. The table exists so that when the data is to be read, the controller will know the location of the data. ATIP is a standard in the art and will not be further described here.

To control the writing of the data, the processors 202–208 are controlled by the digital servo control 212, which is in turn controlled by the RISC processor 216. The RISC processor 216 controls the digital servo control 212 by executing program instructions based upon information provided by the write control 210 and the ATIP processor 214. The main program instructions are stored in the embedded DRAM 108.

Because the digital servo control 212 and the write control 210 are integrated into a single servo/recording processor 114, the same ADC 202 may be utilized by both the servo control 212 and for calibrating the writing to the disc 122. In the preferred embodiment, the ADC 202 has eight channels, four for servo control and four for the sample marks from the calibration area.

Figure 3:
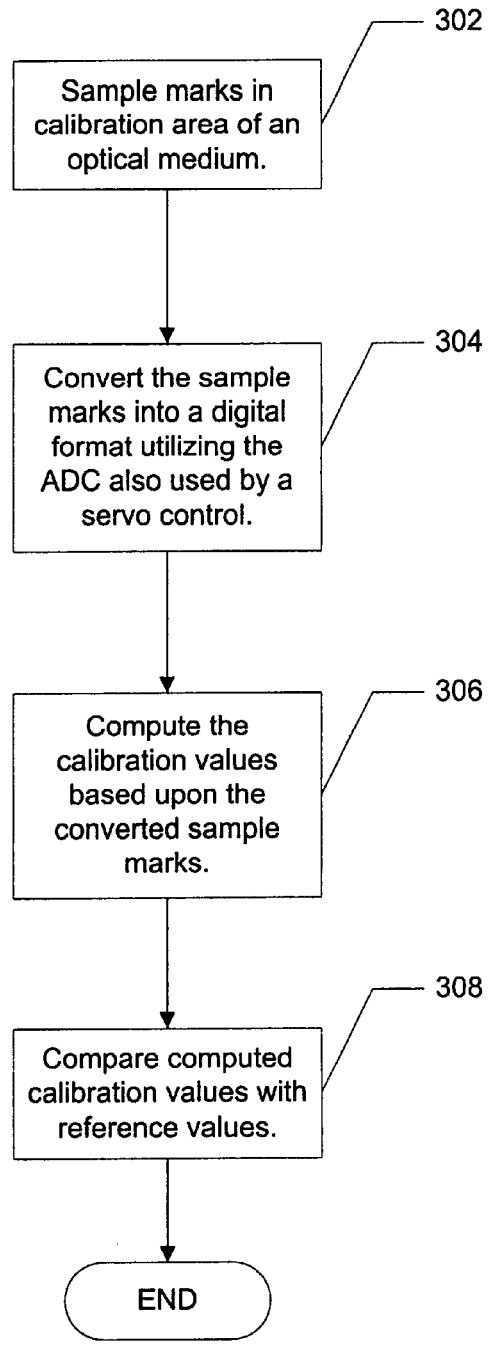
FIG. 3 is a flow chart illustrating a preferred embodiment of a method for calibration of writing to an optical media.

FIG. 3 is a flow chart illustrating a preferred embodiment of a method for calibration of writing to an optical media. First, the marks in the calibration area of an optical medium are sampled, via step 302. The sampled marks are transmitted as an analog signal to the ADC 202. Next, the sample marks are converted to a digital signal, using the ADC 202 which is also used by the digital servo control 212, via step 304. The calibration values are then computed based upon the converted sampled marks, via step 306. In the preferred embodiment, the process amplitude and reflection values for the sampled marks are stored in a set of registers. These values may then be read by the microcontroller, the processor 216, a Multiplier and Accumulator Controller (MAC) (not shown), or some other processor, which computes the calibration values from these values, in accordance with the orange book. Next, the computed calibration values are compared with reference values to determine the quality of the marks, via step 308.

Since the same ADC 202 is used for both servo control and for calibration of writing to an optical medium, no separate subsystem for converting the sampled marks is necessary.

Less components are required, reducing the cost of manufacturing the controller 100. With less components, the risk of component failure is reduced as well.

In the preferred embodiment, the number of each type of mark may also be counted while the marks in the calibration area are sampled. This count is then compared with the known number of each type of mark written. For example, if there is a significant discrepancy between the number of 4T marks counted and the number of 4T marks written, then the write control parameters can be adjusted to tune the writing of 4T marks.

An optional feature provided by the integrated servo/recording processor 114 in accordance with the present invention is the ability to track the quality of the writing while the writing is occurring. The marks may be sampled while the writing is occurring. Small adjustments can be made in the writing. For example, as writing progresses, the recording media changes due to changes in temperature, humidity, or other environmental factors. The changes may cause the writing to be less accurate. The marks may be sampled during this time, and the calibration analysis performed, via steps 302–308 (FIG. 3). Small adjustments, such as tuning the edges of the marks may be made according to the results of the analysis. The sampling can also be used to determine if the quality has degraded too much, requiring the controller to stop writing and recalibrate.

Although the calibration method has been described with the controller illustrated in FIG. 1, other controllers may use the calibration method without departing from the spirit and scope of the present invention.

An improved method and system for calibration of writing to an optical media has been disclosed. The present invention provides a controller with an integrated servo and recording processor which allows a single ADC to be used for converting sample marks used in calibrating the writing to an optical media. No separate subsystem for converting sample marks is thus necessary. Less components are required, reducing the cost of manufacturing the controller. With less components, the risk of component failure is reduced as well.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for calibration of writing to an optical medium, comprising the steps of:
    (a) sampling marks in a calibration area of the optical medium;
    (b) converting the sampled marks into a digital format utilizing an analog-to-digital converter (ADC), the ADC also utilized by a servo control;
    (c) computing calibration values based upon the converted sampled marks;

(d) counting a number of each mark type sampled; and (e) comparing the number of each mark type sampled with a number of each mark type written to allow for tuning of each mark type.

2. The method of claim 1, wherein the converted sample marks comprise process amplitude and reflection values.

3. The method of claim 1, wherein the calibration values comprise a beta value and a gamma value according to a standard.

4. The method of claim 1, further comprising:

(f) comparing the computed calibration values with reference values to determine the quality of the sampled marks.

5. The method of claim 4, further comprising:

(g) adjusting a write control parameter based upon the comparing step (d).

6. A method for calibration of writing to an optical medium, comprising the steps of:

(a) sampling marks in a calibration area of the optical medium;

(b) converting the sampled marks into a digital format utilizing an ADC, the ADC also utilized by a servo control; and (c) computing calibration values based upon the converted sample marks;

(d) counting a number of each mark type sampled; and (e) comparing the number of each mark type sampled with a number of each mark type written to allow for tuning of each mark type.

7. The method of claim 6, further comprising:

(f) comparing the computed calibration values with reference values to determine the quality of the sampled marks.

8. The method of claim 7, further comprising:

(g) adjusting a write control parameter based upon the comparing step f.

9. A method for calibration of writing to an optical medium, comprising the steps of:

(a) sampling marks in a calibration area of the optical medium;

(b) converting the sampled marks into a digital format utilizing an ADC, the ADC also utilized by a servo control;

(c) computing calibration values based upon the converted sample marks; and (d) comparing the computed calibration values with reference values to determine the quality of the sampled marks.

10. A controller for an optical drive, comprising:

a host interface;

a buffer manager coupled to the host interface;

an embedded memory coupled to the buffer manager;

an integrated encoding/decoding engine coupled to the buffer manager;

a data channel interface coupled to the integrated encoding/decoding engine; and an integrated servo/recording processor coupled to the integrated encoding/decoding engine and the data channel interface, wherein the integrated servo/recording processor comprises an ADC, wherein the ADC is utilized by a servo control and for calibration of writing to an optical medium.

11. A system, comprising:

means for sampling marks in a calibration area of an optical medium;

means for converting the sampled marks into a digital format utilizing an ADC, the ADC also utilized by a servo control;

means for computing calibration values based upon the converted sample marks to determine the quality of the sampled marks;

means for counting a number of each mark type sampled; and means for comparing the number of each mark type sampled with a number of each mark type written to allow for tuning of each mark type.

12. A computer readable medium with program instructions for calibration of writing to an optical medium, the instructions for:

(a) sampling marks in a calibration area of the optical medium;

(b) converting the sampled marks into a digital format utilizing an ADC, the ADC also utilized by a servo control;

(c) computing calibration values based upon the converted sample marks to determine the quality of the sampled marks:

(d) counting a number of each mark type sampled; and (e) comparing the number of each mark type sampled with a number of each mark type written to allow for tuning of each mark type.

\* \* \* \* \*